United States Patent [19]

Janky

[11] Patent Number: 5,786,789
[45] Date of Patent: Jul. 28, 1998

[54] GPS AND CELLPHONE UNIT HAVING ADD-ON MODULES

[75] Inventor: James M. Janky, Los Altos, Calif.

[73] Assignee: Trimble Navigation Limited, Sunnyvale, Calif.

[21] Appl. No.: 339,990

[22] Filed: Nov. 14, 1994

[51] Int. Cl.⁶ .................................................. G01S 5/02
[52] U.S. Cl. .................. 342/357; 342/419; 455/33.1; 455/89
[58] Field of Search .............................. 342/357, 419; 455/33.1, 90, 89

[56] References Cited

U.S. PATENT DOCUMENTS

| | | | |
|---|---|---|---|
| 5,043,736 | 8/1991 | Darnell et al. | 342/357 |
| 5,155,860 | 10/1992 | McClure | 455/89 |
| 5,334,824 | 8/1994 | Martinez | 235/380 |
| 5,408,513 | 4/1995 | Busch et al. | 379/59 |
| 5,479,479 | 12/1995 | Braitberg et al. | 379/58 |
| 5,517,682 | 5/1996 | Dayani | 455/89 |

Primary Examiner—Thomas H. Tarcza
Assistant Examiner—Dao L. Phan
Attorney, Agent, or Firm—Patrick T. King

[57] ABSTRACT

A GPS unit and a cellular telephone unit each have add-on modules for providing additional functionality. A battery powered hand-held GPS unit has a battery power module with a built-in cellular telephone. The controls on the GPS unit are used to control cellular telephone operations. The GPS controlled cellular telephone transmits position location information obtained by the GPS unit. Alternatively, a battery powered hand-held cellular telephone unit has a battery power module with a built-in GPS device. The controls on the cellular telephone portion are used to control GPS device operations. The cellular telephone portion is able to transmit position location information obtained by the GPS device. The GPS and a cellular telephone device can function with either a standard battery module, or with a battery module having a cellular telephone or a GPS device built into the battery module.

14 Claims, 9 Drawing Sheets

GPS AND CELLPHONE UNIT HAVING ADD-ON MODULES

TECHNICAL FIELD

This invention relates to GPS and cellular telephone devices. Specifically, the present invention relates to hand-held GPS and cellular telephone units.

BACKGROUND ART

Hand-held GPS devices, such as the Scout by Trimble Navigation, Ltd. and hand-held cellular telephone devices, such as the Micro Tac flip-phones by Motorola, Inc. are both well known in the prior art. Such devices are battery powered by a battery pack which is attached either to the hand-held GPS device or to the cellular telephone device. When the batteries are discharged, a charged battery pack is attached to the hand-held GPS device or to the cellular telephone device. Hand-held GPS devices and hand-held cellular telephone devices operate in different frequency regimes and function independently of each other. Typical hand-held GPS devices do not have cellular telephone capability, and, typical cellular telephone devices do not have GPS capability.

Prior Art FIG. 1A shows a perspective view of a small, battery powered, hand-held GPS receiver 10. With reference next to Prior Art FIG. 1B, a bottom view of GPS receiver 10 is shown. Receiver 10 includes a battery portion 12. Battery portion 12 can be a cover plate disposed over batteries such as, for example, 4 AA batteries, or may be the outline of, for example, a rechargeable power supply. In the Prior Art, receiver 10 functions only as a GPS receiver. That is, receiver 10 has no cellular telephone capabilities. Thus, if a user wishes to relay his or her position information to a remote station, the user must first locate suitable communication facilities.

Prior art FIG. 2 shows a combined GPS and cellular telephone device 20. The combined GPS and cellular telephone device 20 is, for example, a "remote unit" as set forth U.S. Pat. No. 5,043,736 to Darnell et al. The Darnell remote unit includes an RF L-band receiver for a global positioning system and a cellular phone system. The GPS and cellular telephone systems of the Darnell reference are permanently combined and integrated into a single unit.

While combination GPS and cellular telephone devices are known, the additional expense, bulk, and complexity associated with such combination devices may not appeal to a consumer at the time of purchase. The consumer may desire only the functionality of a GPS device or the functionality of a cellular phone and later may want to add additional functionality.

The need has arisen for a GPS and cellular phone combination which does not inherently add substantial expense, or bulk or to an originally purchased device. Additionally, the combined GPS and cellular phone device should not appear to be substantially more complex in operation than a single GPS or cellular telephone unit to avoid intimidating a potential consumer.

DISCLOSURE OF THE INVENTION

It is therefore an object of the present invention to provide a GPS and cellular phone combination which does not inherently add substantial expense, or bulk or to the device, and which does not intimidate a potential consumer by appearing to be substantially more complex than a single GPS or cellular telephone unit at the time of purchase. The above object has been achieved by a GPS device and a cellular telephone device having add-on modules.

In accordance with this and other objects of the invention, a hand-held communication device is provided which includes two functions: a position-locating function and a cellular telephone function. The communication device includes a core module and a removable add-on module. Two functions are provided according to the invention. The core module provides one function and the add-on module provides the other function. The core module has means, such as a keypad and display screen, for entering and displaying information. The core module provides a first function. The core module also includes a removable add-on module. The removable add-on module is removably coupled to the core module and includes a power unit for providing power to the first function in the core module. The removable add-on module also has a second means integral therewith for providing a second function. The first function and the second function include a GPS function and a cell phone function. Power as well as control and information signals are removably coupled between the core module and the removable add-on module. In addition, the core module includes means for controlling the second function provided by the removable add-on module.

In one embodiment of the invention, a battery powered hand-held GPS unit has a main GPS unit which is structured such that a battery power module can be attached to and removed from the hand-held GPS portion. In this embodiment, a battery pack power module, which is attachable to or removable from the hand-held GPS portion, includes a built-in cellular telephone unit. The display and button controls on the main GPS unit are then used to control standard cellular telephone operations. The GPS controlled cellular telephone unit transmits position location information obtained by the GPS unit. In so doing, the consumer can purchase a GPS device which has a standard appearance but which is capable of being upgraded to a combination GPS and cellular telephone unit, which is operated by the display and controls of the GPS unit.

In another embodiment of the invention, a battery-powered hand-held cellular telephone unit has a main cellular telephone unit which is structured such that a battery power module, or battery pack, can be attached to and removed from the cellular telephone portion. In this embodiment, a battery power module which is attachable to or removable from the cellular telephone portion includes a built-in GPS unit. The controls on the cellular telephone portion are then used to control the GPS unit operations. The cellular telephone portion is able to transmit position location information obtained by the GPS device. Thus, a combined GPS and cellular telephone unit is disclosed which can function as a telephone with a standard battery module, or with a battery module having a GPS device built into the battery module.

Therefore, the present invention provides a GPS and cellular phone combination which does not inherently add substantial expense, or bulk or to the device, and which does not intimidate a potential consumer by appearing to be substantially more complex than a single GPS or cellular telephone unit at the time of purchase.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1A:
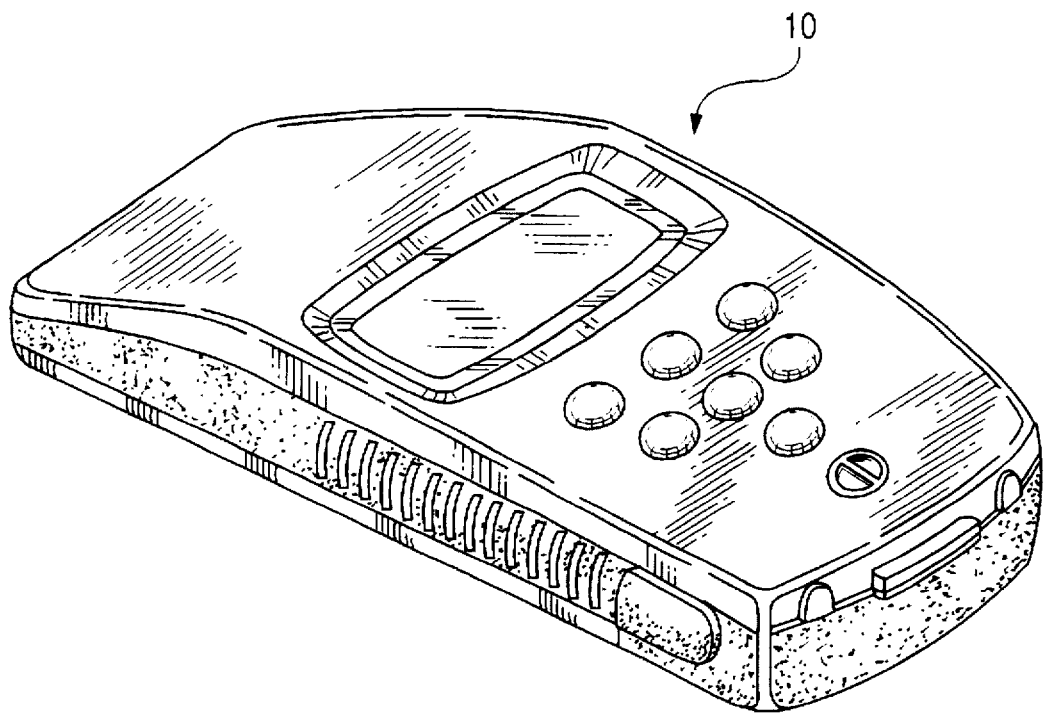
FIG. 1A is a perspective view of a Prior Art small, battery powered, hand-held GPS receiver.
Figure 1B:
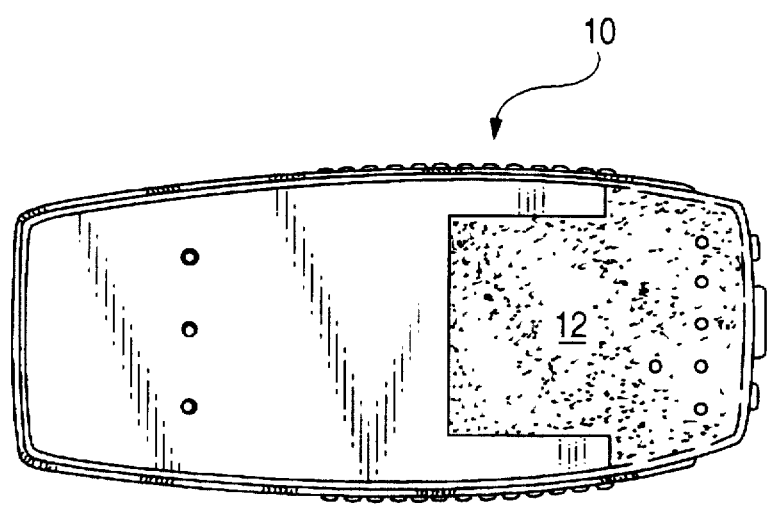
FIG. 1B is a bottom view of the Prior Art receiver of FIG. 1A.
Figure 2:
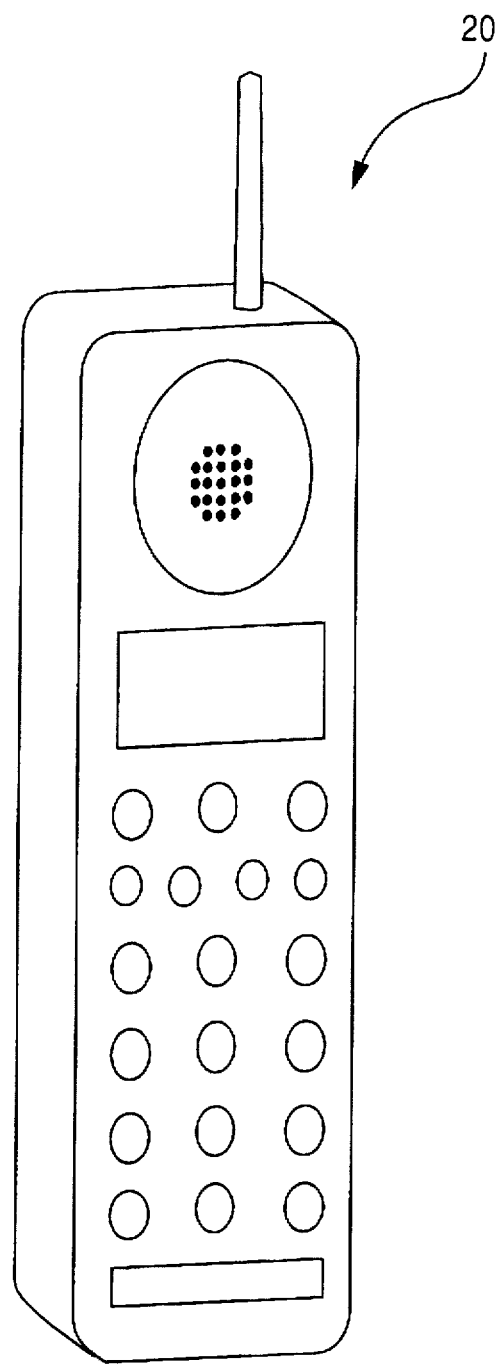
FIG. 2 is a front elevation view of a Prior Art combined single-unit GPS and cellular telephone device.
Figure 3A:
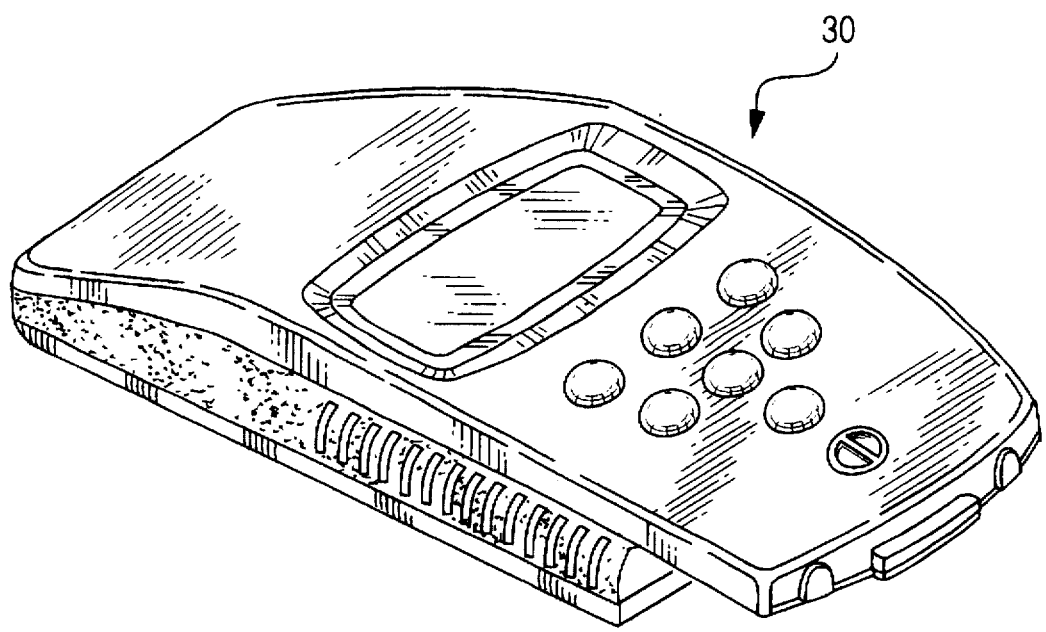
FIG. 3A is a perspective view of one embodiment of a GPS unit wherein the battery portion of GPS device 30 has been removed.

FIG. 3A shows a perspective view of one embodiment of a GPS device 30 wherein the battery portion of the GPS device 30 has been removed. GPS receiver 30 is, for example, the Scout GPS, available from Trimble Navigation Limited of Sunnyvale, Calif.

Figure 3B:
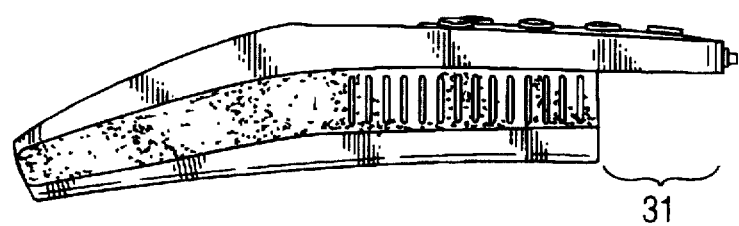
FIG. 3B is a side view of the GPS unit of FIG. 3A.

FIG. 3B shows a side view of the device 30. A cavity 31 exists where batteries or a battery pack would normally reside. Although GPS device 30 of FIGS. 3A and 3B is, for example, the Scout GPS, the present invention is also well suited to use with numerous other GPS devices well known in the art.

Figure 4A:
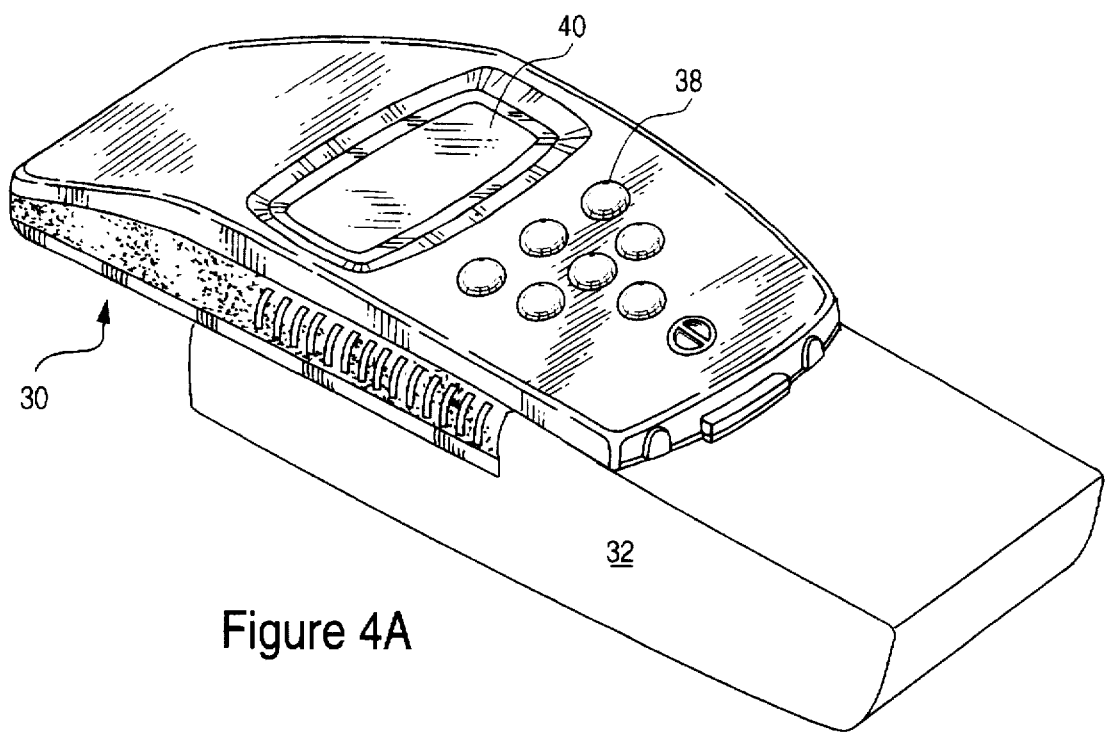
FIG. 4A is a perspective view of an add-on module including an integral cellular telephone removably attached to a GPS device in accordance with the present invention.

With reference next to FIG. 4A, a perspective view is shown of a GPS device 30 with an attached add-on module 32 in accordance with the present invention. As shown in FIG. 4A, in the present embodiment of the invention, the add-on module 32 is inserted into the cavity 31 of the GPS device 30. In addition to supplying power to GPS device 30 via, for example, a battery pack, the add-on module 32 also includes a built in cellular telephone. In the present invention, the GPS device 30 is adapted to receive either a standard battery supply or a combined power source and cellular telephone as embodied in add-on module 32.

Figure 4B:
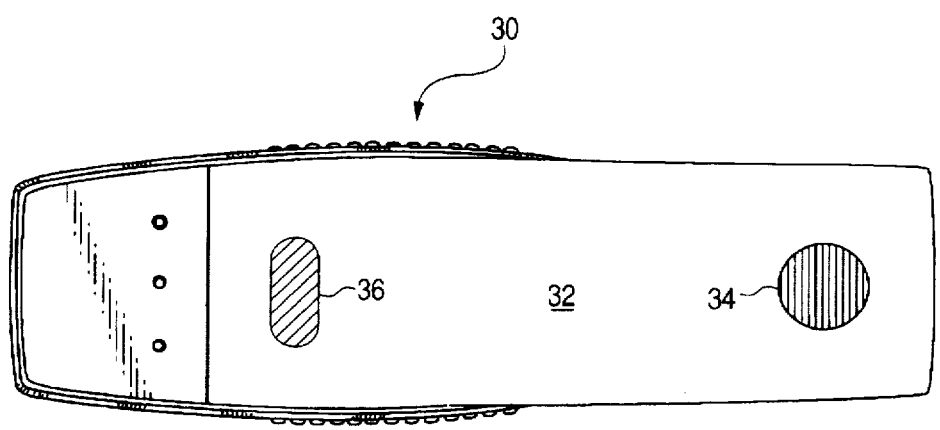
FIG. 4B is a bottom view of add-on module including an integral cellular telephone removably attached to a GPS device as shown in FIG. 4A in accordance with the present invention.

With reference next to FIG. 4B, a bottom view of an add-on module 32 attached to GPS device 30 is shown. As shown in FIG. 4B, add-on module 32 includes a microphone 34 and earphone 36. Thus, add-on module 32 allows a user to perform standard speaking and listening operations. Furthermore, the present invention can transmit position location information obtained from GPS device 30. In so doing, a user of GPS device 30 can have his or her position location information transmitted by the cellular telephone portion of add-on module 32 to an interested party. The present invention is also well suited to having position location information obtained from GPS device 30 automatically transmitted, via the cellular telephone portion of add-on module 32, to an interested party.

With reference still to FIGS. 4A and 4B, GPS device 30 is modified to include circuitry for controlling standard cellular functions necessary to operate the cellular telephone portion of add-on module 32. That is, functions such as but not limited to dialing, sending, scrolling, ending, etc. are selected and controlled using control buttons, or keys, typically shown as 38 and a display screen 40 present on the GPS device 30. Thus, the present invention provides an independent GPS device 30 which is easily upgraded to include complete cellular telephone functions. A GPS device 30 of the present invention would not intimidate potential consumers by appearing overly complex or bulky. Also, the GPS device of the present invention does not necessarily have the increased cost associated with prior art devices in which the GPS and cellular telephone are permanently combined in a single structure. Rather, in the present invention, purchase costs can be spread between GPS device 30 and add-on module 32.

Figure 5:
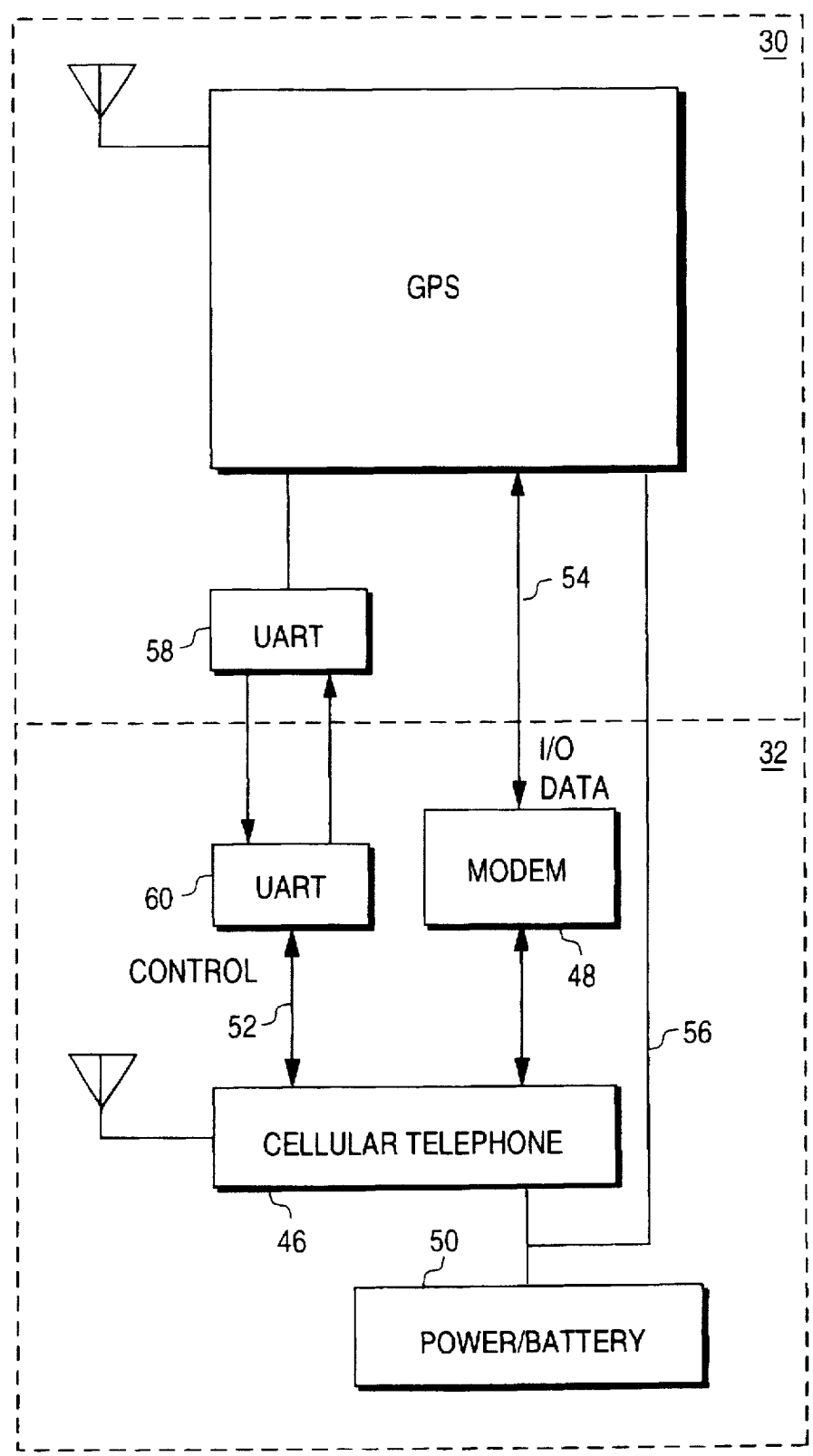
FIG. 5 is a schematic circuit diagram illustrating the interconnections between a GPS device and an add-on module in accordance with the present invention.

With reference next to FIG. 5, a simplified schematic diagram illustrating the interconnections between a GPS device 30 and an add-on module 32 is shown. The add-on module 32 includes a cellular telephone circuit 46, a modem circuit 48, and a power/battery source 50. The interconnections between the GPS device 30 and the add-on module 32 are completed in the present embodiment through a control bus 52, an I/O data bus 54, and power bus 56. As shown in FIG. 5, the control connection between the GPS device 30 and the add-on module 32 is accomplished using two UARTs 58 and 60. Control bus 52 connects the keyboard of the GPS device 30 to the cellular telephone portion 46 of add-on module 32. In this manner, the standard functions necessary to operate the cellular telephone portion 46 of the add-on module 32 are controlled through the keys of the GPS device 30. I/O data is transferred between the GPS device 30 and the add-on module 32 via the modem circuit and the I/O data bus 54. Data is transferred in suitable format from either the GPS device 30 to the add-on module 32, or from the add-on module 32 to the GPS device 30. Additionally, the power bus 56 provides power from the power/battery source 50 to the GPS device 30. Power/battery source 50 also provides power to the cellular telephone portion 46 of add-on module 32 as shown in FIG. 5.

Figure 6:
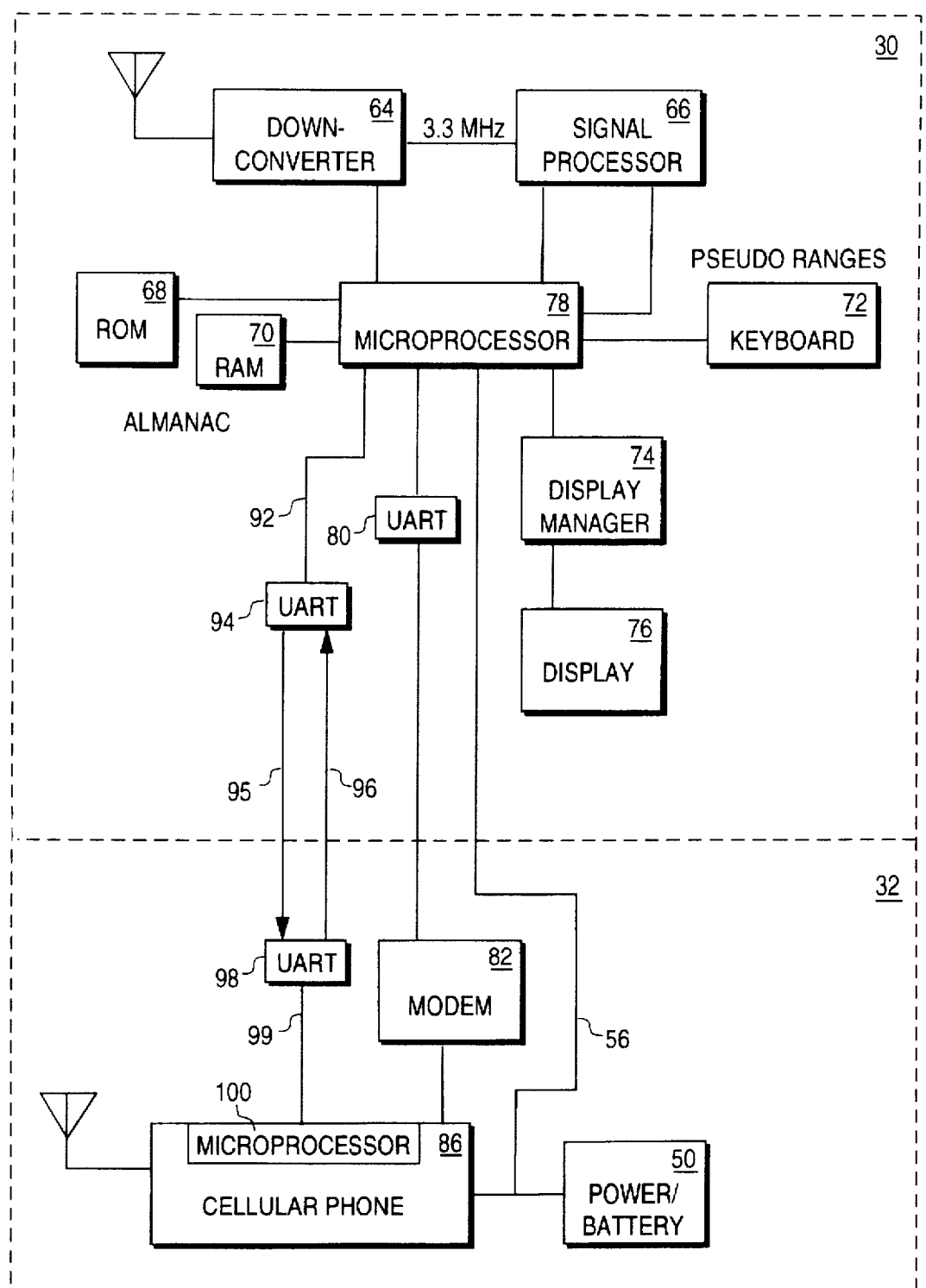
FIG. 6 is a schematic circuit diagram illustrating features of a GPS device and the interconnections between a GPS device and an add-on module in accordance with the present invention.

FIG. 6 shows a more detailed schematic diagram illustrating the features of the GPS device 30 and more detailed interconnections between the GPS device 30 and the add-on module 32. The GPS device 30 typically includes such features as a down converter 64, a signal processor 66, ROM 68, RAM 70, a keyboard 72, a display manager 74, a display 76, and a standard microprocessor 78. The GPS device 30 also includes a UART 80 for transferring signals between the microprocessor 78 of the GPS device 30 and a modem circuit 82 of the add-on module 32. Although the present embodiment shows UART 80 separate from microprocessor 78, the present invention is also well suited to directing signals into a microprocessor which has a UART contained therein.

With reference again to FIG. 6, keyboard entries made at the keyboard 72 are used to operate a cellular telephone portion 86 of the add-on module 32. Pressing of the keys on the GPS device 30 simulates the pressing of keys on a cellular telephone. Therefore, commands entered at the GPS device 30 will drive a cellular telephone circuit portion 86 of the add-on module 32.

During typical operation, control signals are transmitted from microprocessor 78 of the GPS device 30 through a control bus 92 to UART 94. Lines 95, 96 between UART 94 and a UART 98 each transmit digital data in only direction. Additionally, control bus 99 directs the data directly into a microprocessor 100 of the cellular telephone portion 86 of add-on module 32. Although the present embodiment shows the UART 94 separate from the microprocessor 78 and the UART 98 separate from the microprocessor 87, the present invention is also well suited to directing signals directly into the microprocessor of the GPS device and then directly into the microprocessor of the cellular telephone portion of the add-on module when both microprocessors have a UART contained therein. It is known in the art that each type of cellular telephone employs a different control protocol. Therefore, although the present invention describes interfacing between a GPS device 30 and an add-on module 32, the actual coding of the commands to be transferred over the control bus is different for each type of cellular telephone.

Referring still to FIG. 6, the present invention teaches removably attaching an add-on module 32 containing a cellular telephone 86 to a GPS device. However, as the technology of cellular telephones advances, the present invention is also well suited to forming cellular telephone portion 86 of the present invention using cellular telephone chip sets within the add-on module on module 32.

Figure 7A:
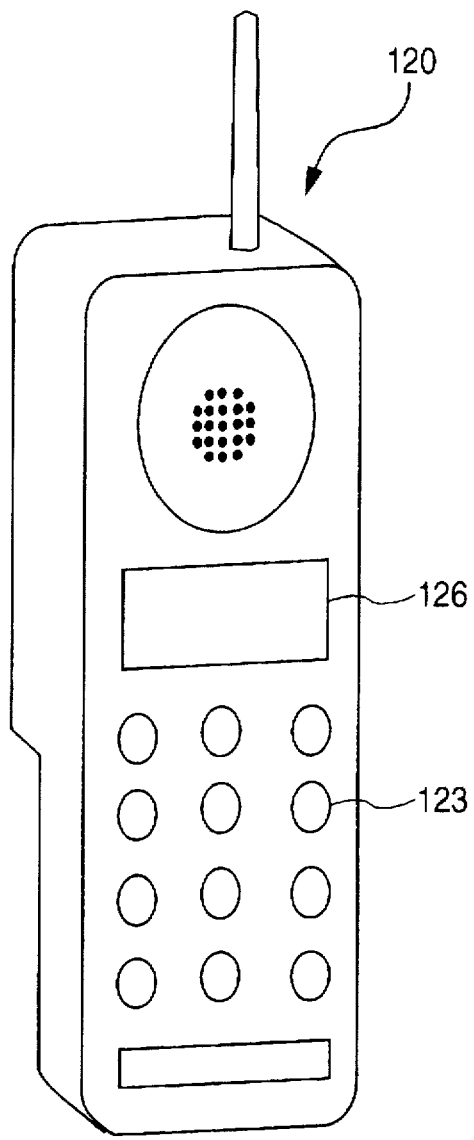
FIG. 7A is a front view of one embodiment of a cellular telephone device wherein the battery portion of a cellular telephone device has been removed in accordance with the present invention.

FIG. 7 shows a front view of a cellular telephone device 120 which has the battery portion thereof removed.

Figure 7B:
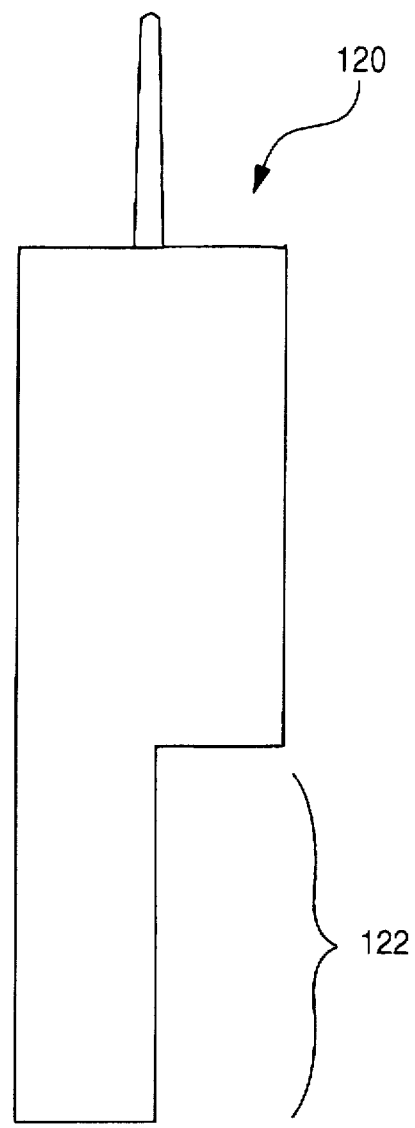
FIG. 7B is a side view of the cellular telephone device of FIG. 7A in accordance with the present invention.

FIG. 7B shows a side view of the cellular telephone device 120 with a cavity 122 is where batteries or a battery pack would normally reside.

Figure 8:
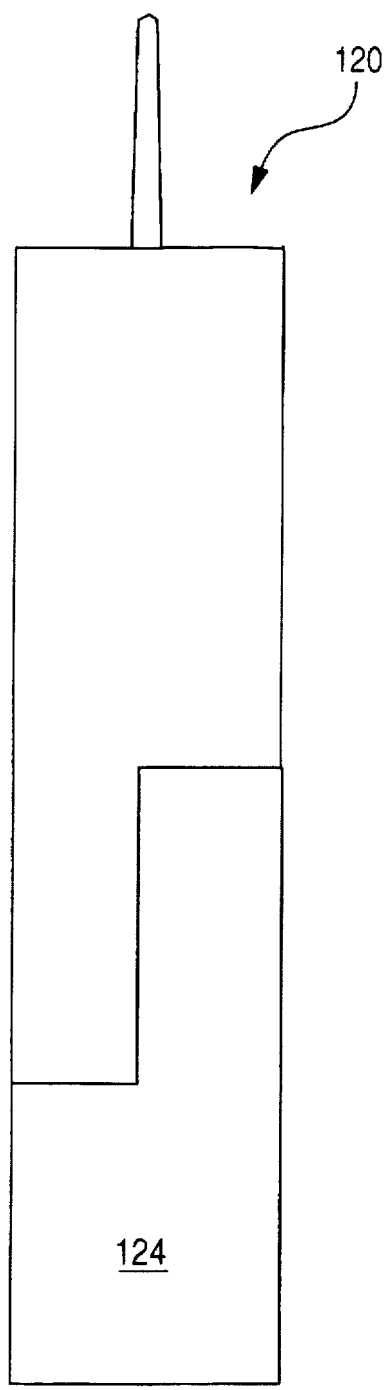
FIG. 8 is a perspective view of an add-on module including an integral GPS removably attached to a cellular telephone device in accordance with the present invention.

FIG. 8 shows a perspective view of an add-on module 124 attached to the cellular telephone device 120 in accordance with the present invention. The add-on module 124 is inserted into the cavity 122 of the cellular telephone device 120. The cellular telephone device 120 includes a keyboard having keys (typically shown as 123) and a display screen 126. In addition to supplying power to the cellular telephone device 120 via, for example, a battery pack, add-on module 124 also includes a built in GPS receiver device. The cellular telephone device 120 is adapted to receive either a standard battery pack or a combined power source and a GPS receiver as embodied in the add-on module 124. Thus, the add-on module 124 allows a user to obtain standard GPS position location information.

In the present embodiment, the GPS receiver of the add-on module 124 has no controls or display screen. The cellular telephone keys (typically shown as 123) are used as control keys in combination with a display screen 126. All of the GPS information is displayed on the display screen 126 of the cellular telephone device 120. The present invention is also well suited to having such control and display features included in the add-on module 124. In the present invention, the cellular telephone device 120 can transmit position location information obtained from the GPS receiver of the add-on module 124. In so doing, a user of cellular telephone device 120 has his or her position location information transmitted by cellular telephone device 120 to an interested party. The present invention is also well suited to having position location information obtained from the GPS receiver of add-on module 124 automatically transmitted, via the cellular telephone device 120, to an interested party.

The cellular telephone device 120 is modified by the invention to include circuitry for controlling standard GPS functions necessary to operate the GPS receiver portion of the add-on module 124. That is, functions such as, but not limited to, indicating latitude, longitude, altitude, speed, heading etc. are selected and controlled using the control buttons, or keys, present on the cellular telephone device 120. Thus, the present invention provides an independent cellular telephone device 120 which can be easily upgraded to include complete GPS functions. Therefore, cellular telephone device 120 of the present invention does not intimidate potential consumers by appearing overly complex or bulky. Also, the cellular telephone of the present invention does not necessarily have the increased cost associated with prior art devices in which the GPS and cellular telephone are permanently combined in a single structure. Rather, in the present invention, purchase costs can be spread between the cellular telephone device 120 and removably attachable add-on module 124.

Figure 9:
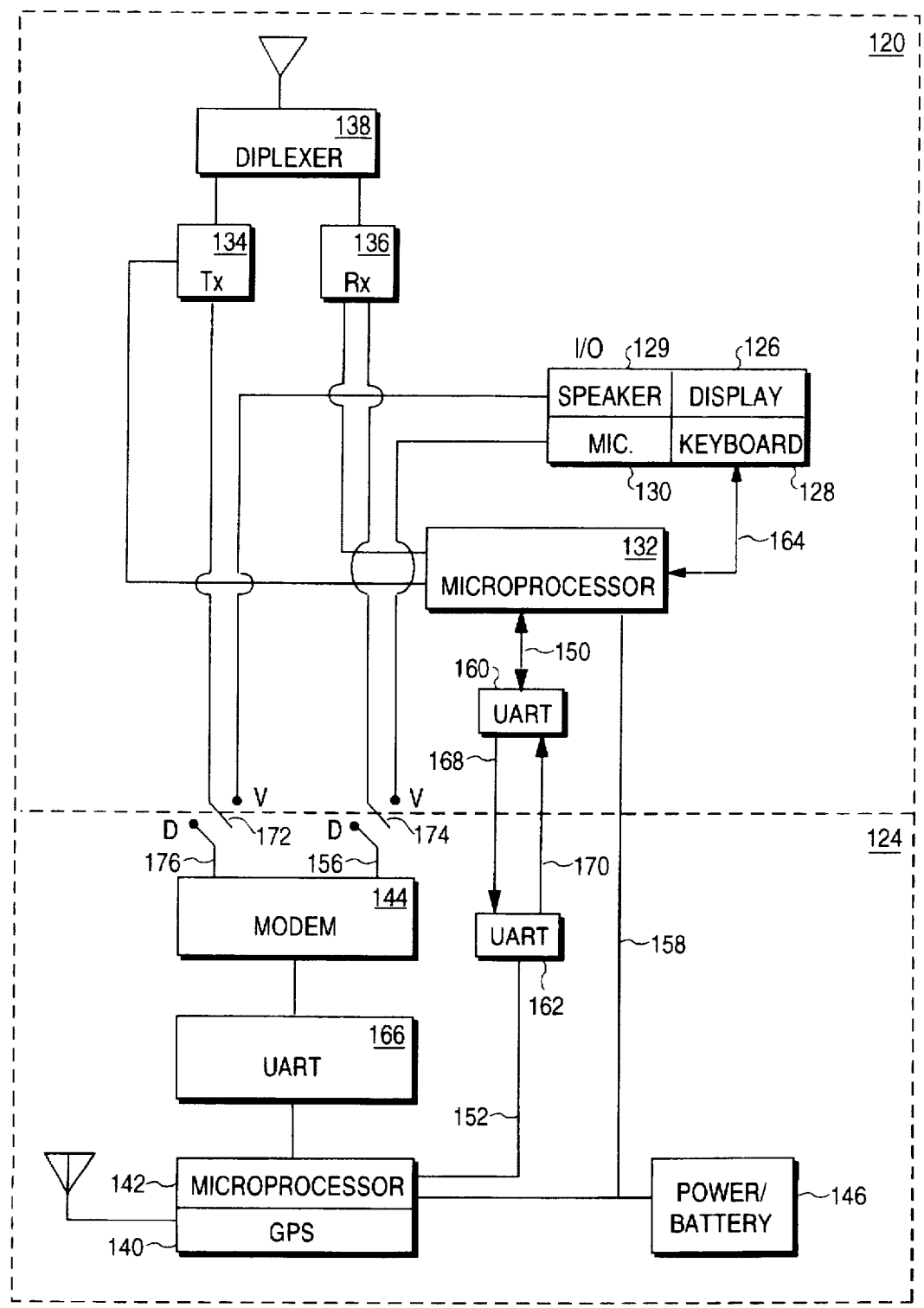
FIG. 9 is a schematic circuit diagram illustrating features of a cellular telephone device and the interconnection of the cellular telephone device and a GPS add-on module.

FIG. 9 shows a schematic diagram illustrating the interconnections between the cellular telephone device 120 and the add-on module 124 is shown. The cellular telephone device 120 typically includes such features as a display 126, a keyboard 128 with keys 123, a speaker 129, a microphone 130, a microprocessor 132, a transmitter circuit 134, a receiver circuit 136, and a duplexer circuit 138.

The add-on module 124 includes a GPS device 140 including a microprocessor 142, a modem circuit 144, and a power/battery source 146. The interconnections between the cellular telephone device 120 and the add-on module 124 are completed in the present embodiment through a control bus 150, 152, I/O data lines 154, 156, and a power bus 158. Power bus 158 provides power from the power/battery source 146 to GPS device 140. These power/battery source 146 also provides power to the cellular telephone portion. The control connections between the cellular telephone device 120 and the add-on module 124 are accomplished using two UARTs 160, 162, control buses 150, 152 connect the keyboard 128 of the cellular telephone device 120 through the microprocessor 132 to the microprocessor 142 of the GPS device 140. In this manner, the standard functions necessary to operate the GPS device 140 of the add-on module 124 are controlled through the keyboard 128 of the cellular telephone device 120. I/O data is transferred between the cellular telephone device 120 and the add-on module 124 via the modem circuit 144 and the I/O data lines 154, 156. In so doing, data can be transferred in suitable format from either the cellular telephone device 120 to the add-on module 124, or from the add-on module 124 to the cellular telephone device 120. The add-on module 124 also includes a UART 166 disposed between the microprocessor 142 of the GPS device 140 and the modem 144 of add-on module 124. Although the present embodiment shows the UART 166 separate from the microprocessor 142, the present invention is also well suited to directing signals into a microprocessor which has a UART contained therein.

With reference still to FIG. 9, keyboard entries made at the keyboard 128 are used to operate the GPS portion 140 of the add-on module 124. That is, the pressing of keys on the cellular telephone device 120 simulates the pressing of keys on a GPS device. Therefore, commands entered at cellular telephone device 120 will drive the GPS device portion 140 of the add-on module 124. During typical operation, control signals are transmitted from the microprocessor 132 of the cellular telephone device 120 through the control bus 150 to the UART 160. Lines 168 and 170 each transmit digital data in only one direction. Additionally, control bus 152 directs the data directly into the microprocessor 142 of the GPS device portion 140 of the add-on module 124. Although the present embodiment shows the UART 160 separate from the microprocessor 132 and the UART 162 separate from the microprocessor 142, the present invention is also well suited to directing signals directly into the microprocessor of the cellular telephone device and directly into the microprocessor of the GPS device portion of the add-on module when both microprocessors have a UART contained therein. Additionally, it is known in the art that each type of cellular telephone employs a different control protocol. Therefore, although the present invention sets forth interfacing between a cellular telephone device 120 and an add-on module 124, the actual coding of the commands to be transferred over the control buses 150, 152 is different for each type of cellular telephone.

Referring again to FIG. 9 in the present embodiment, interconnections between lines 154, 156 of the add-on module 124 and the receiver 136 and the transmitter 134 are accomplished using switches 172, 174. That is, if data from GPS device 140 is to be transmitted to cellular telephone device 120, each of the switches 172, 174 contact point "D". However, when the cellular telephone device 120 is operating in normal voice mode, the switches 172, 174 contact point "V". Although the present embodiment employs switches 172, 174, the present invention is also well suited to using other connection methods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A hand-held communication device providing a position-locating function and a cellular telephone function, comprising:
    a hand-held core module having means for entering information including control information, means for displaying information, and first means for providing a first function;
    a removable add-on module containing a battery and removably fixed to said core module for providing power to said first means, said removable add-on module also having second means integral therewith for providing a second function;
    wherein said first function and said second function includes a GES function and a cell phone function; and
    means for removably coupling power from the battery as well as control and information signals between said core module and said removable add-on module, wherein said core module includes means for controlling the second function provided by the removable add-on module;
    whereby the hand-held core module and the removable add-on module are fixed together to provide an integral hand-held communication device containing a battery and having a position-locating function and a cellular telephone function.

2. The communication device of claim 1 wherein the first means includes the GPS means and the second means includes the cell-phone means.

3. The communication device of claim 1 wherein the first means includes the cell-phone means and the second means includes the GPS means.

4. The communication device of claim 1 wherein means for entering information includes a keypad on said core module.

5. The communication device of claim 1 wherein the means for displaying information includes a display screen on said core module.

6. The communication device of claim 1 wherein the means for providing cell-phone functions includes a microphone and speaker.

7. A hand-held device having position-locating and cellular telephone capabilities comprising:
    a hand-held position-locating unit,
    a removable battery power module, removably fixed to said hand-held position-locating unit to form an integral hand-held device having position-locating and cellular telephone capabilities, wherein said battery power module includes a battery for providing power to said position-locating unit, wherein said battery power module includes a cellular telephone circuit integral therewith, and wherein the hand-held position-locating unit and the removable battery power module together form an integral hand-held unit; and
    means for removably coupling power as well as control and information signals between said position-locating unit and said removable battery power module.

8. The device of claim 7 including control means, located on said position-locating portion of said hand-held position-locating unit and coupled to said cellular telephone circuit integral with said battery power module, for controlling said cellular telephone circuit.

9. The device of claim 7 wherein said cellular telephone circuit includes means for transmitting position location information obtained by said position-locating unit.

10. The device of claim 7 wherein said position-locating unit includes a GPS unit.

11. A hand-held device having cellular telephone and position-locating capabilities comprising:
    a hand-held cellular telephone unit;
    a removable battery power module removably fixed to said cellular telephone unit to form an integral hand-held unit, wherein said battery power module includes means for providing power to said hand-held cellular telephone unit and wherein said battery power module includes a position-locating device integral therewith; and
    means for removably coupling power as well as control and information signals between said cellular telephone unit and said battery power module.

12. The device of claim 11 including control means, located on said cellular telephone unit and coupled to said position-locating device integral with said battery power module, for controlling said position locating device.

13. The device of claim 12 wherein said cellular telephone portion includes means for transmitting position location information obtained by said position-locating device integral with said battery power module.

14. The device of claim 11 wherein the cellular telephone unit includes a microphone and speaker.

* * * * *